DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JULY 28, 1970

876 O.G. 815

T876,003

ENERGY CONVERSION DEVICE

Keith O. Hever, Loughborough, England, assignor to Ford Motor Company, Dearborn, Mich., a corporation of Delaware

Filed Nov. 14, 1969, Ser. No. 876,819
**Int. Cl. H01m *35/00***
U.S. Cl. 136—6
1 Sheet Drawing. 4 Pages Specification

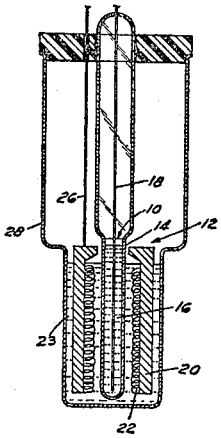

A secondary battery is made by using a cationically conductive ceramic separator to separate a molten alkali metal anode from a cathode compartment containing a metallic material in a non-aqueous solvent. Useful alkali metals include sodium, potassium, etc., and compositions useful in the cathode compartment include copper chloride, copper sulfide, nickel fluoride, etc., dissolved in solvents such as dimethylsulphoxide N-dimethyl formamide, propylene carbonate, etc. Other salts can be added to the electrolyte to increase its conductivity. Cations of the alkali metal pass through the separator easily but the separator blocks passage of the materials and anions in the cathode compartment. Graphite felt can be used in the cathode compartment as an energy collector. Useful separator materials include those disclosed in U.S. Pat. 3,404,-036. The battery has an extremely high theoretical energy density and exhibits excellent charge and recharge capability.

July 28, 1970 K. O. HEVER T876,003
ENERGY CONVERSION DEVICE
Filed Nov. 14, 1969
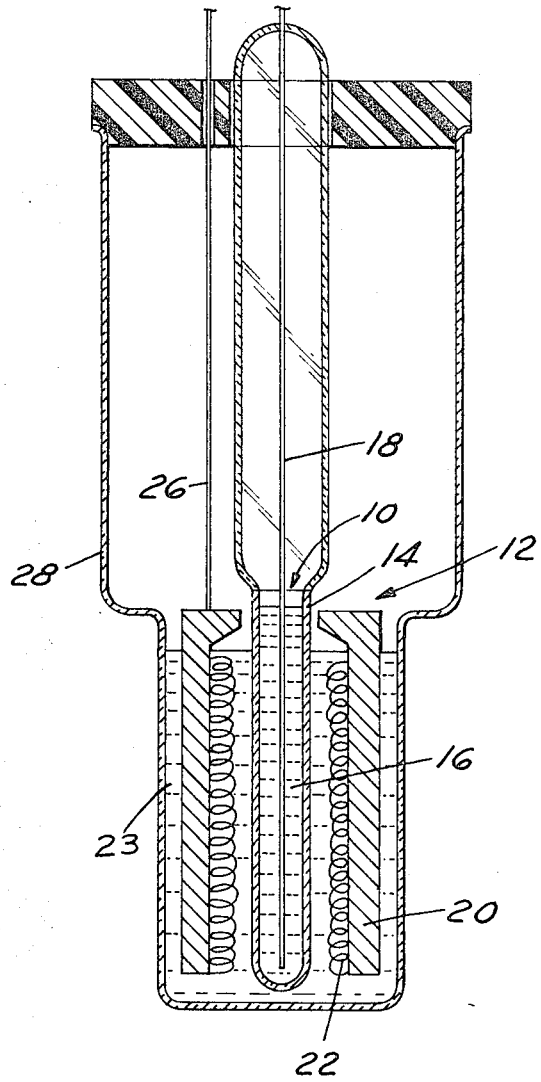
INVENTOR
KEITH O. HEVER
BY John R. Faulkner
Glenn S. Arendsen
ATTORNEYS